Figure 1:
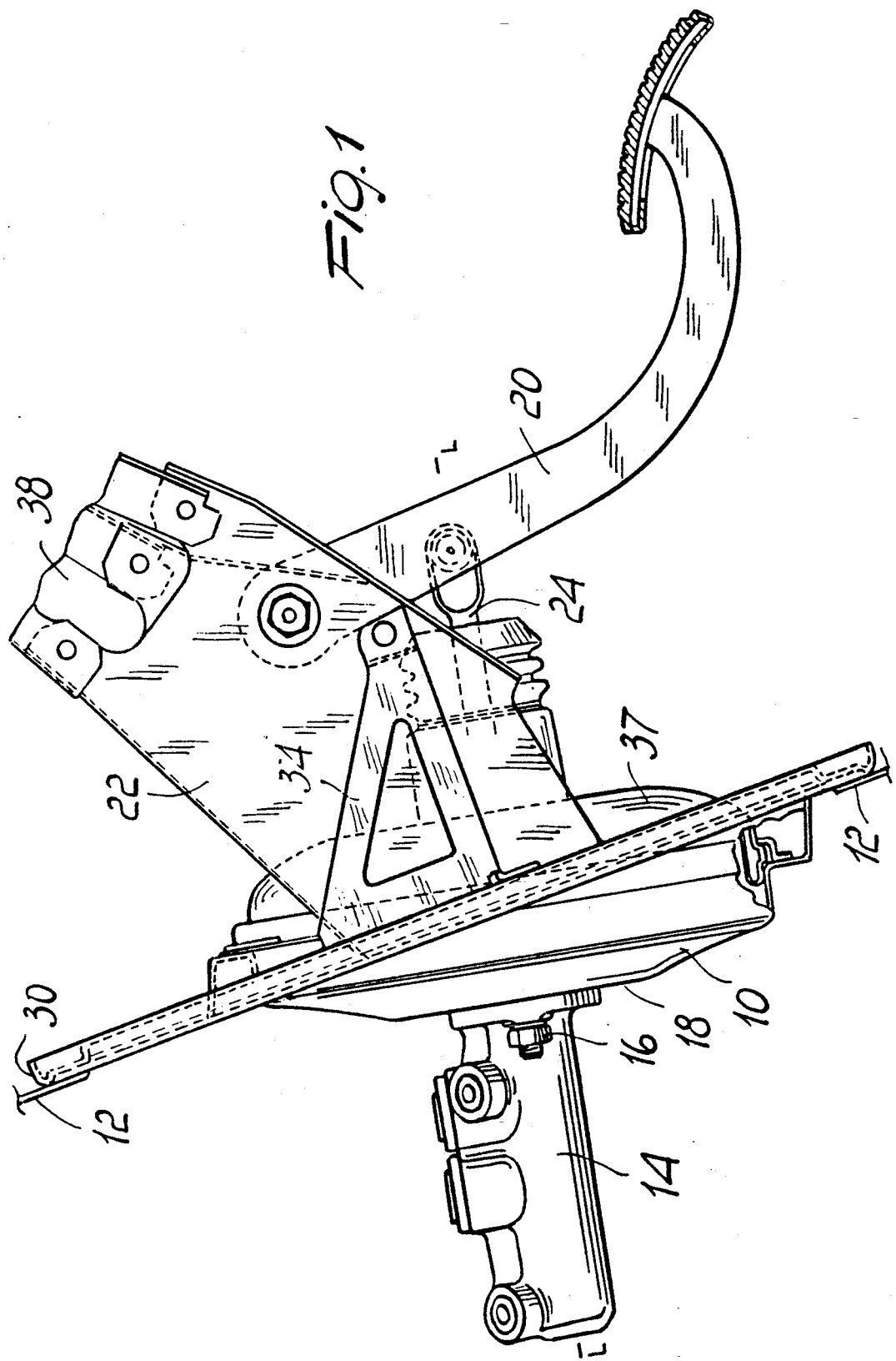

United States Patent [19]

Cadeddu

[11] Patent Number: 5,167,305
[45] Date of Patent: Dec. 1, 1992

[54] PNEUMATIC BRAKE BOOSTER ASSEMBLY
[75] Inventor: Leonardo Cadeddu, Crema, Italy
[73] Assignee: Bendix Italia, Crema, Italy
[21] Appl. No.: 859,232
[22] Filed: Mar. 26, 1992

Related U.S. Application Data

[63] Continuation of Ser. No. 634,980, Jan. 7, 1990, abandoned, which is a continuation of Ser. No. 370,658, Jun. 22, 1989, abandoned.

[30] Foreign Application Priority Data

Jun. 23, 1988 [IT] Italy .................. 21008 A/88

[51] Int. Cl.⁵ .................................... F16H 21/44
[52] U.S. Cl. .................... 188/357; 60/547.1; 296/1.1; 303/4
[58] Field of Search ............... 92/161, 169.2, 128, 92/169.3; 188/356, 357; 303/4, 12, 1; 296/1.1, 24.1, 39.1, 39.3; 60/547.1; 91/369.1

[56] References Cited

U.S. PATENT DOCUMENTS

| | | | |
|---|---|---|---|
| 2,834,184 | 5/1958 | Ingres | 60/54.6 |
| 3,027,778 | 4/1962 | Risnes | 74/512 |
| 3,048,980 | 8/1962 | Cousino et al. | 60/54.6 |
| 3,049,100 | 8/1962 | Rike | 60/547.1 |
| 3,200,597 | 8/1965 | Stotz | 60/54.6 |
| 3,237,525 | 3/1966 | Stelzer | 60/547.1 X |
| 3,714,780 | 2/1973 | Shellhause | 60/54.6 |
| 4,212,167 | 7/1980 | Pruett | 60/594 |
| 4,586,580 | 5/1986 | Spielmann et al. | 180/89.1 |
| 4,592,438 | 6/1986 | Spielmann et al. | 180/89.1 |
| 4,640,478 | 2/1987 | Leigh-Monstevens | 248/27.1 |
| 4,658,660 | 4/1987 | Parker | 74/102 |
| 4,783,964 | 11/1988 | Fanelli et al. | 60/547.1 |

Primary Examiner—Matthew C. Graham
Attorney, Agent, or Firm—Larry J. Palguta; Ken C. Decker

[57] ABSTRACT

The present invention relates to a pneumatic brake booster assembly for a vehicle comprising a brake booster (10) formed from two shells (18; 37), a master-cylinder (14) mounted on the booster (10), a brake pedal (20) operatively linked to the booster (10) and mounted on a support bracket (22). According to the invention, one of the shells (18; 37) of the brake booster (10) is formed by a plate (26) upon which is mounted the support bracket (22), the plate (26) being destined to form a part of a firewall (12) of the vehicle.

5 Claims, 2 Drawing Sheets

PNEUMATIC BRAKE BOOSTER ASSEMBLY

This is a continuation of abandoned application Ser. No. 07/634,980 filed Jan. 7, 1990 which is a continuation of abandoned application Ser. No. 07/370,658 filed Jun. 22, 1989.

The present invention relates to a vacuum brake booster assembly for use on automotive vehicles.

As a general rule a vacuum brake booster is mounted on the vehicle firewall inside the engine compartment and supports, on its face opposite the firewall, a brake master-cylinder. A brake pedal assembly is generally mounted, on the side of the firewall facing the passenger compartment, independently of the mounting of the brake booster assembly.

The document DE-A-33 46 140 describes a pneumatic brake booster in which the rear shell of the booster is formed by a part of the vehicle firewall The brake pedal assembly is, however, separately mounted on an adjacent part of the opposite side of the firewall.

Modern vehicle assembly techniques make increasing use of robots. Motor vehicle manufacturers therefore require that the various components of a vehicle be adapted where possible for assembly by a robot using the minimum of operations.

It is therefore an object of the present invention to provide a pneumatic brake booster assembly which, together with the brake pedal, forms a distinct sub-assembly which can easily be mounted in a vehicle during its manufacture, and in which one shell of the booster is formed by a part of the firewall of the vehicle.

According to the invention, there is provided a pneumatic brake booster assembly for a vehicle comprising a brake booster formed from two shells, a master-cylinder mounted on the booster, a brake pedal operatively linked to the booster and mounted on a support bracket, characterized is that one of the shells of the brake booster is formed by a plate upon which is mounted the support bracket, the plate being destined to form a part of a firewall of the vehicle.

Figure 2:
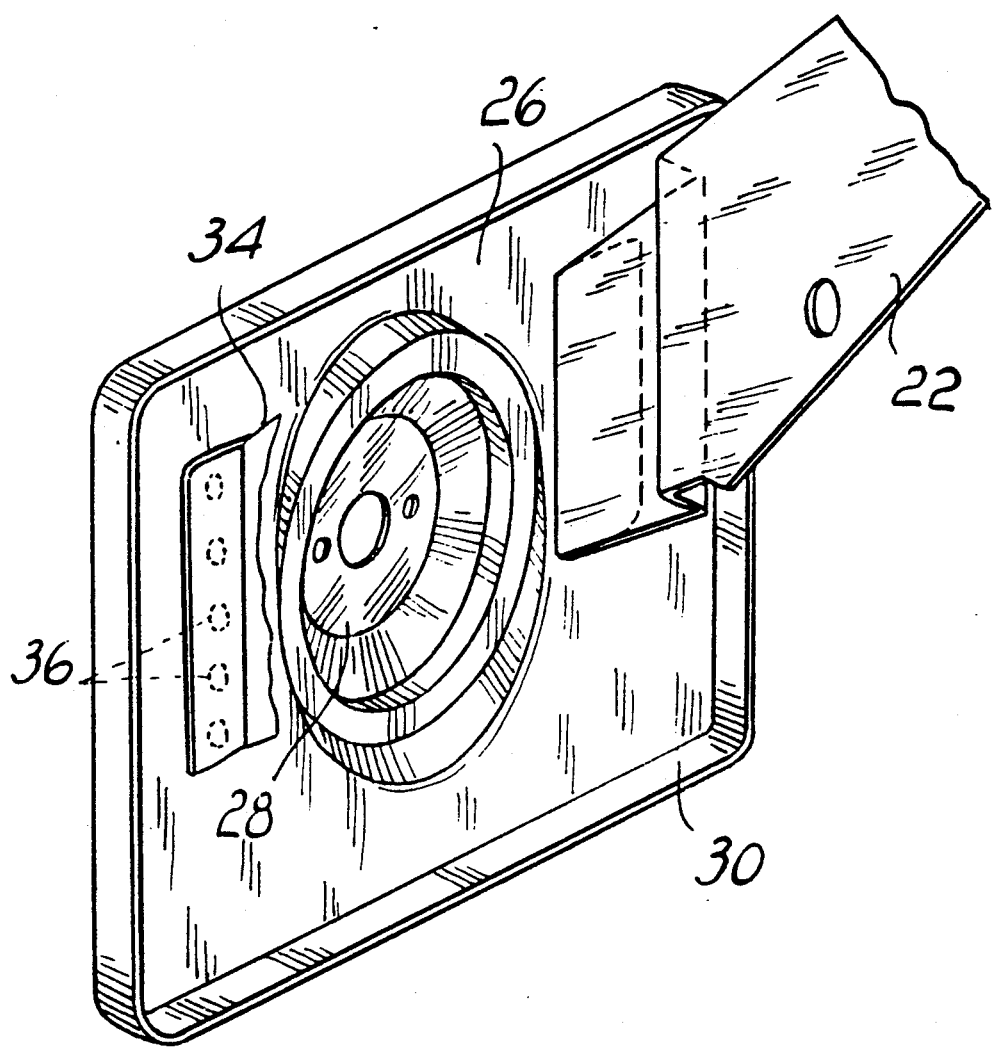

One embodiment of the invention will now be described by way of example with reference to the accompanying drawings, in which:

FIG. 1 is a side view, in partial section, of a pneumatic brake booster assembly in accordance with the present invention; and FIG. 2 is a partial perspective view of a component of the assembly of FIG. 1.

As shown in FIG. 1, a pneumatic booster 10 is mounted, as will be discussed in greater detail below, on the firewall 12 of a vehicle (not shown). A conventional master-cylinder 14 is mounted by means of bolts 16 on the face of the front shell 18 of the booster remote from the firewall 12. A brake pedal 20 is pivotably mounted on a support bracket 22. An input rod 24 is operatively linked to the booster 10 and is pivotably mounted at one end on the brake pedal 20.

As shown in FIG. 2, the front shell 18 of the booster 10 is formed from a plate 26 whose dimensions exceed those of the surface of the booster 10 and which is destined to form part of the vehicle firewall. The plate 26 is generally rectangular in the illustrated embodiment but other shapes are envisaged, for example circular. The plate 26 is formed, for example by pressing, so that the shape of its central region 28 is that of the front shell normally used to form the booster. In the example shown, the central region is formed at a given angle to the plane of the plate 26 so that the longitudinal axis L—L of the booster lies at this angle to the firewall 12. It is envisaged that this mounting angle be varied in order to comply with the requirements of motor manufacturers.

The plate 26 is formed with a peripheral flange 30 arranged at right angles to the plane of the plate 26 and which serves to locate the plate on the firewall 12 around the opening. Two pedal brackets 22 and 34, of which one is partially shown in FIG. 2, are mounted on the plate 26 by spot welds or rivets 36. The ends of the brackets 34 remote from the plate 26 converge and are connected to a dashboard and steering column support bracket 38 which is partially shown in FIG. 1. As previously discussed, the brake pedal 20 is pivotably mounted on the support bracket 22.

In use, the pneumatic brake booster assembly is constituted by mounting the master-cylinder 14 on the central region 28 of the plate 26. The rear shell 37 of the booster 10, with the internal components attached thereto, is located on the plate 26 and is sealingly, but releasably attached in place. The brake pedal 20 is then connected to the booster 10 to form the complete assembly which is ready for mounting on the firewall 12 of a vehicle.

Thus, in accordance with the invention, a brake booster assembly is provided which is lighter than previously proposed devices and is easily mounted in a vehicle during its manufacture, resulting in a reduction of a part of manufacturing costs, and in which one shell of the booster is formed by the firewall of the vehicle.

It is envisaged that the plate 26 could also carry a clutch master-cylinder together with the clutch pedal mounted on the other bracket 34. As the forces between the brake pedal 20 and the master-cylinder 14 are transmitted principally by the plate 26, the rear shell 37 of the booster 10 can be made correspondingly less strong. It is therefore envisaged that, in accordance with the invention, the rear shell be formed of thin metal sheet or of plastics material.

Furthermore, the use of the plate 26 to form part of the firewall 12 and the front shell 18 of the booster 10 means that the whole assembly is more rigid than conventional boosters. Thus, the degree of flexing of the assembly during braking is reduced and produces a corresponding slight reduction in the brake pedal travel.

It is further envisaged that it could be the rear shell of the booster that is formed by the plate 26 with corresponding modifications to the rest of the booster 10.

I claim:

1. A pneumatic brake booster assembly to be mounted on a firewall of a vehicle, comprising a brake booster formed from first and second shells, a master cylinder mounted directly and only on said first shell, a brake pedal operatively linked to the booster and mounted on a support bracket, and the bracket and booster assembly supported by the firewall via an assembly plate having a central region in which said first shell is located, said plate being nonreleaseably integral with said bracket and said first shell.

2. The assembly of claim 1, wherein said central region is formed by pressing the plate so as to constitute said first shell.

3. The assembly of claim 2, wherein a longitudinal axis of the booster is inclined at a given angle to the plane of said firewall.

4. The assembly of claim 2, further comprising a second support bracket integral with said plate and associated with a clutch pedal.

5. The assembly of claim 2, wherein said second shell is formed of plastic material.

* * * * *